Dec. 18, 1956     C. E. JOHANSSON ET AL     2,774,515
TRANSPORTATION CONTAINERS FOR BULK MATERIALS
Filed July 20, 1953     4 Sheets-Sheet 1
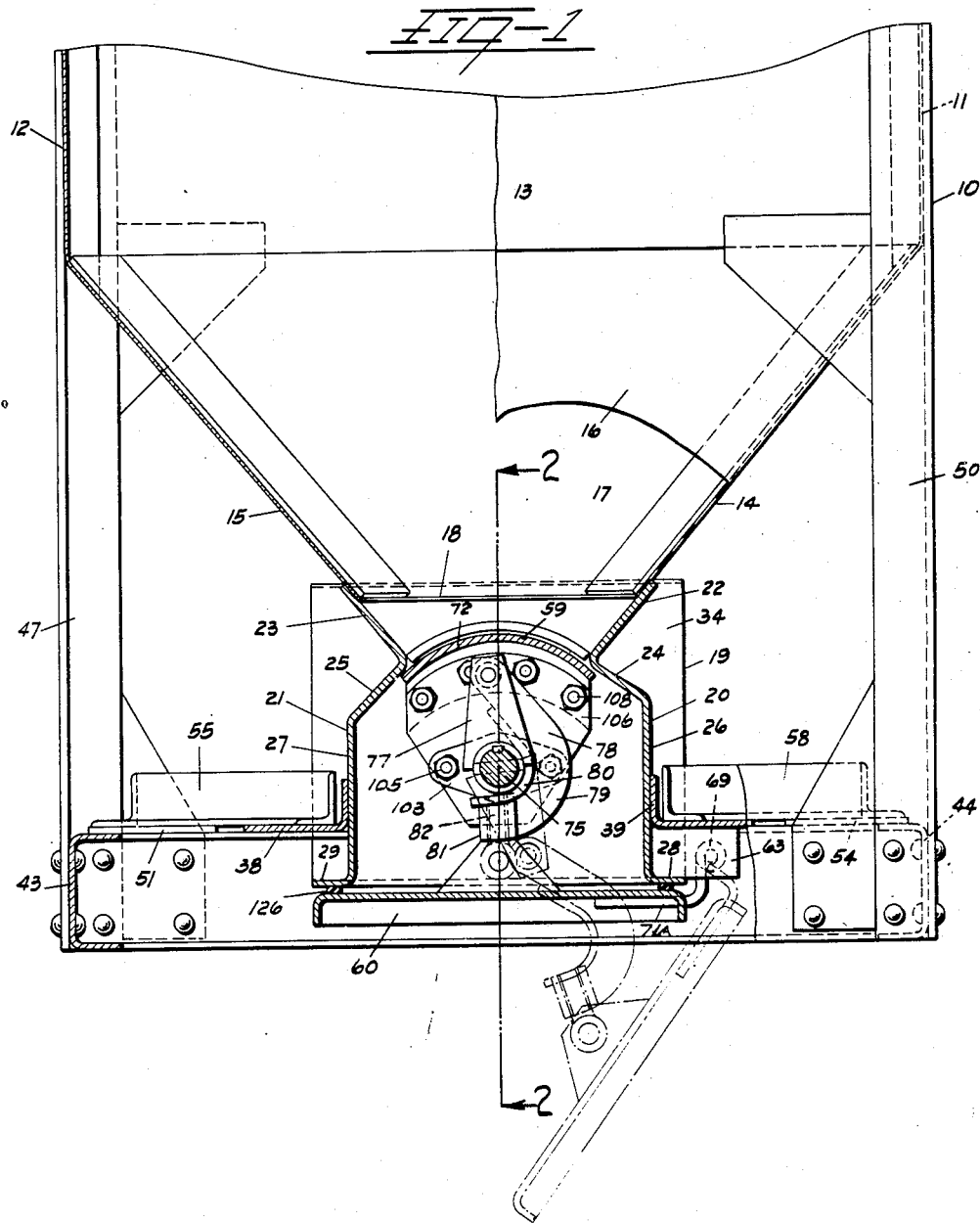
INVENTORS
CARL E. JOHANSSON
ALBERT S. NOBLE
BY Samuel Reese
ATTY.

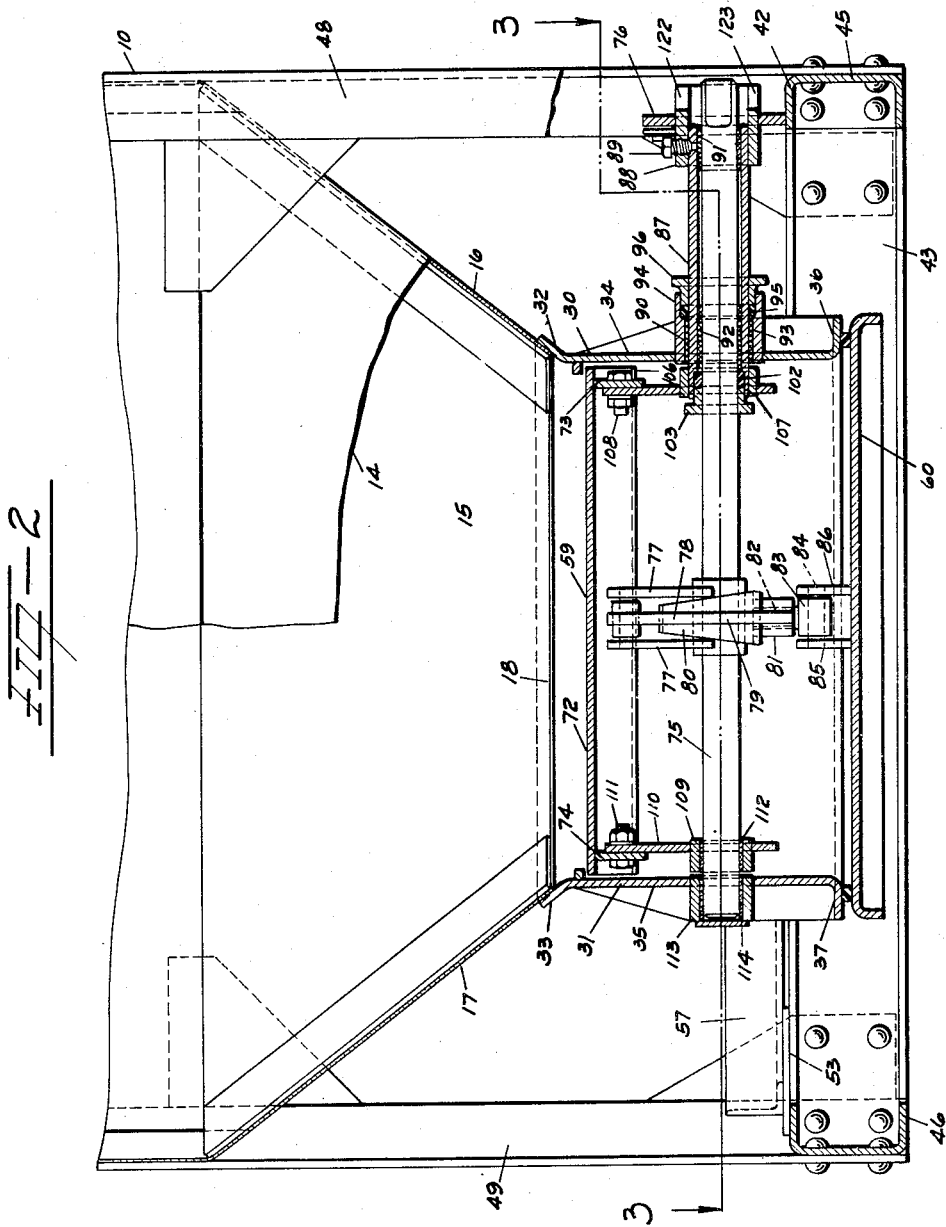

Dec. 18, 1956 C. E. JOHANSSON ET AL 2,774,515
TRANSPORTATION CONTAINERS FOR BULK MATERIALS
Filed July 20, 1953 4 Sheets-Sheet 3
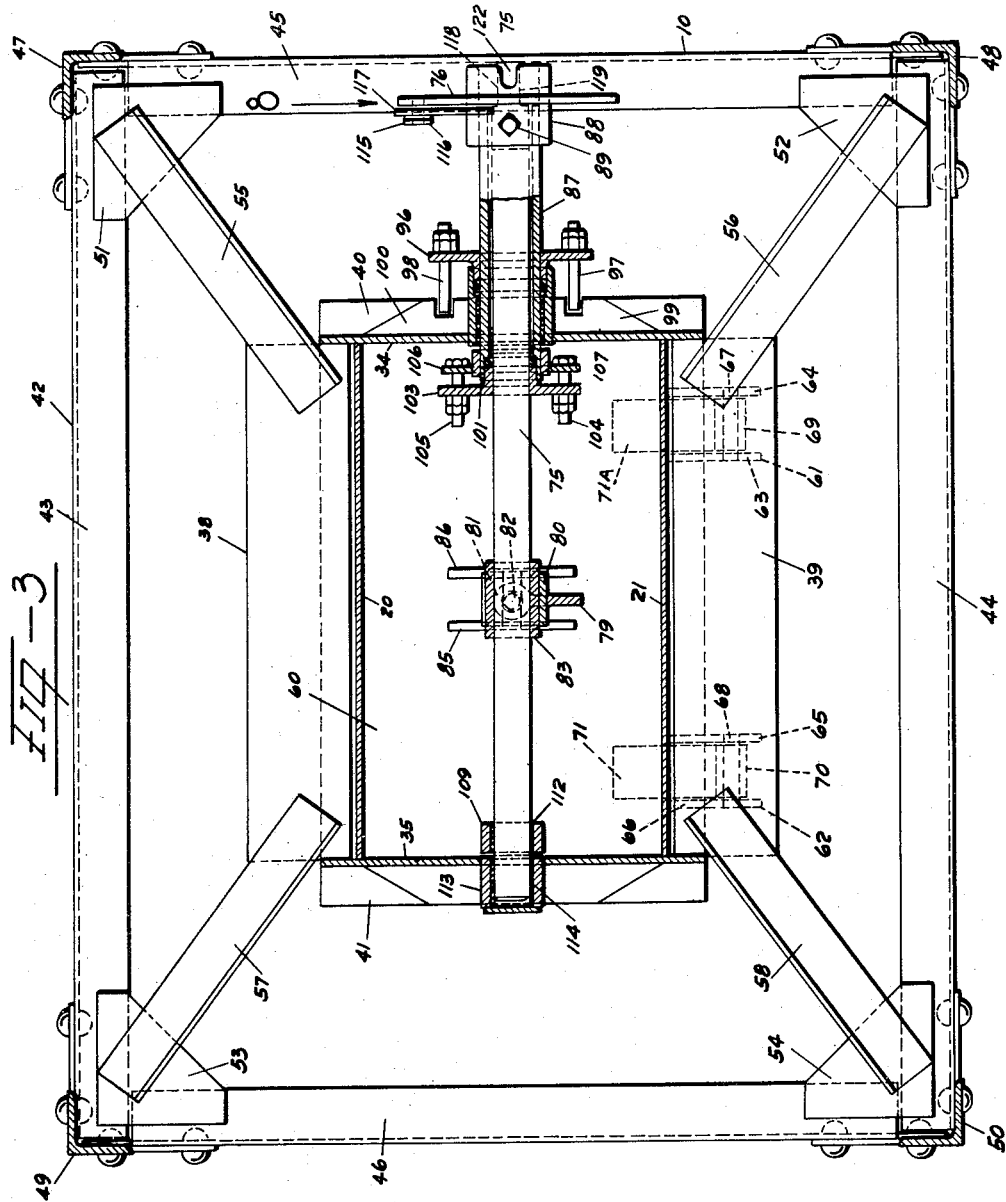
INVENTORS
CARL E. JOHANSSON
ALBERT S. NOBLE
By Samuel Reese
ATTY.

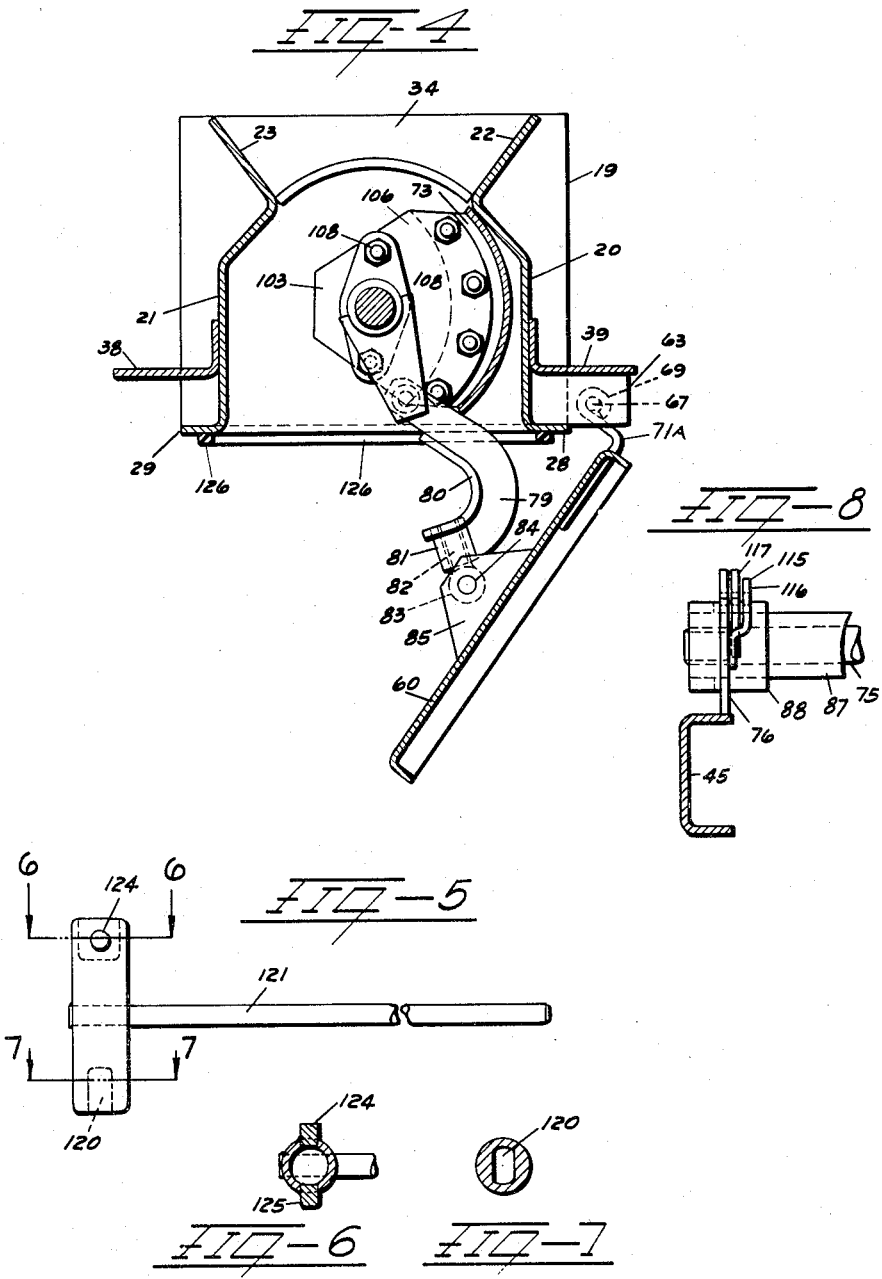

United States Patent Office 2,774,515
Patented Dec. 18, 1956

2,774,515

TRANSPORTATION CONTAINERS FOR BULK MATERIALS

Carl E. Johansson and Albert S. Noble, Cleveland, Ohio, assignors to The Youngstown Steel Door Company, Cleveland, Ohio, a corporation of Ohio Application July 20, 1953, Serial No. 368,973

6 Claims. (Cl. 222—185)

This invention relates to transportation containers for bulk materials and more particularly to containers adapted for the transportation of alkaline and carbide bulk materials which are affected by moisture although obviously not limited to such materials.

It is an object of this invention to provide containers for the transportation of bulk materials which shall protect the materials from moisture.

It is a further object of this invention to provide containers for the transportation of bulk materials which shall protect the materials from moisture during transportation and storage and which shall permit controlled discharge of the materials.

A further object is to provide containers for the transportation of bulk materials which shall embody closures for bottom discharge openings formed in the containers adapted to protect the materials from moisture and operable by mechanism of simple construction.

A further object is to provide containers for the transportation of bulk materials which shall embody a rotary valve and a hinged door adapted to close bottom discharge openings formed in the containers so as to protect the materials from moisture and which shall be supported from the same shaft while being independently operable from the same location.

A further object is to provide containers for the transportation of bulk materials which shall embody a rotary valve and a hinged door adapted to close bottom discharge openings formed in the containers so as to protect the materials from moisture and which shall be operable by mechanism so constructed as to conserve space and be actuated by different parts of the same actuating member.

A further object is to provide containers for the transportation of bulk materials which shall embody bottom closures for discharge openings formed in the containers that include doors loosely hinged adjacent to the discharge openings and operable by means of linkage secured to shafts journalled in the containers wherein the doors shall be secured to the linkage by means permitting adjustment of the doors relative to the linkage and the hinge pins so as to insure moisture-tight engagement between the doors and sealing strips fastened to the containers around the discharge openings.

Other objects of the invention will become clear as the description thereof proceeds.

In the drawings forming part of this specification:

Fig. 1 is a view partly in elevation and partly in section showing a portion of a container embodying the instant invention, the door of the closure for the discharge opening being shown open in dot and dash lines.

Fig. 2 is a vertical section taken on line 2—2 of Fig. 1.

Fig. 3 is a horizontal section taken on line 3—3 of Fig. 2.

Fig. 4 is a sectional view of the discharge opening and closure therefor shown in open position.

Fig. 5 is a plan view of the actuating wrench.

Fig. 6 is a vertical section taken on line 6—6 of Fig. 5.

Fig. 7 is a vertical section taken on line 7—7 of Fig. 5.

Fig. 8 is an end elevation looking in the direction of the arrows in Fig. 3 showing one of the features of the instant invention.

In the drawings, the reference numeral 10 designates as a whole a bulk materials container embodying the instant invention. Only the lower portion of the container is shown, it being understood that the portion of the container above the slope sheets may be rectangular in section to the top of the container or that this portion may be partly rectangular in section and partly in the form of a truncated pyramid. With either construction it will be understood that a door or doors are provided in the top of the container and that these doors when in closed position will be sealed in any desired manner so as to exclude the entrance of moisture into the container.

In addition to the side sheets 11 and 12 of the container and corresponding end sheets, one of which is indicated at 13, the container embodies side slope sheets 14 and 15 and end slope sheets 16 and 17. The slope sheets converge downwardly and are spaced apart at their lower ends to provide a discharge opening 18.

The lower ends of the slope sheets are supported upon and secured to a substantially rectangular frame 19. The frame 19 embodies side members 20 and 21 having upper downwardly converging portions 22 and 23 having the same slope as the slope sheets which are supported and secured thereto. Below the portions 22 and 23 the side frame members 20 and 21 diverge downwardly as shown at 24 and 25 and then vertically downwardly as shown at 26 and 27. The vertical portions 26 and 27 are flanged outwardly as shown at 28 and 29 in a substantially horizontal plane.

The frame 19 also embodies end frame members 30 and 31 which have upper portions 32 and 33 sloped similarly to the slope sheets which are secured and supported thereon. From the portions 32 and 33 the end frame members extend vertically downwardly as shown at 34 and 35 and then outwardly to provide horizontal flanges 36 and 37 which lie in the same plane as the flanges 28 and 29 of the side frame members.

Side and end angle members 38, 39, 40 and 41 are secured to the frame 19 as by means of welding. The frame 19 is supported, in part at least, by the base 42 of the container. The base 42 which, as illustrated, is rectangular in outline, is formed of side and end channel-shaped members 43, 44, 45 and 46 secured together by means of vertical angle corner members 47, 48, 49 and 50 and by means of the corner gussets 51, 52, 53 and 54. Supporting angle members 55, 56, 57 and 58 extend between and are secured to these gussets and the angle members 38, 39, 40 and 41 which are secured to the frame 19.

In order to provide a moisture-proof closure for the discharge opening of the container and at the same time provide for controlled discharge of bulk materials from the container the instant invention utilizes a rotary valve 59 adapted to lie across the discharge opening 18 and a hinged door 60 disposed below the rotary valve and adapted to close the frame 19. The door 60 is loosely hinged upon the frame 19 by means of hinges 61 and 62. These hinges embody vertical plates 63 and 64 and 65 and 66 which extend between the horizontal flange 28 of the side frame member 20 and the angle member 39 secured to the side frame member 20. Hinge pins 67 and 68 are carried by the vertical plates and are loosely embraced by the eyes 69 and 70 of hinge straps 71 and 71A. As shown more clearly in Fig. 1 of the drawings the door 60 when in closed position and the frame 19 lie above the lower surface of the base 42 of the container.

The rotary valve 59 is in the form of a curved plate 72 which is reinforced by means of plates 73 and 74 welded to the underside of the valve.

According to the instant invention the rotary valve 59 and the door 60 are operable independently of each other from the same location by means of the same actuating member. For this accomplishment a shaft 75 is journalled in the end frame members 30 and 31 and in a plate member 76 welded to and extending upwardly from the base 42. Links 77 are fastened upon the shaft 75 substantially midway between the end framing members 30 and 31 so as to rotate with the shaft. A curved link 78 is pivotally connected to the upper end of the links 77. By reason of its curvature as shown in Fig. 1 of the drawings the link 78 lies below the shaft 75 when the door 60 is in closed position.

As illustrated the link 78 embodies a plate member 79 to the inner edge of which a crosswise extending plate member 80 is welded. A boss 81 is welded to and extends downwardly from the lower end of the plate member 80 and abuts the lower edge of the plate member 79 of the curved link. The curved link 78 may, of course, be formed as a casting if desired.

The boss 81 is internally threaded and is adapted to receive the externally threaded shank 82 which extends from a boss 83 pivotally secured substantially to the center of the door by means of a pin 84 carried by the plates 85 and 86 which are secured to the inner face of the door as by means of welding.

A sleeve 87 is mounted upon the operating end of the shaft 75 so as to be rotatable relative to the shaft about the axis of the shaft. A cylindrical extension 88 is fastened upon the end of the sleeve 87 as by means of a set screw 89. The extension 88 is journalled as shown in Fig. 2 of the drawings in the plate member 76 secured to the base 42 of the container. The sleeve 87 is journalled in a bearing 90 secured as by means of welding to the end frame member 30. Bushings 91 and 92 are disposed between the shaft 75 and the sleeve 87 and a bushing 93 is disposed between the sleeve 87 and the bearing 90. The outer end 94 of the bearing 90 is reduced in thickness so as to receive a packing 95 which is retained upon the sleeve 87 by means of a gland 96 secured against axial movement relative to the sleeve by means of bolts 97 and 98 welded to ribs 99 and 100 secured to the end frame member 30. The inner end 101 of the sleeve 87 is also reduced in thickness as shown in Figs. 2 and 3 of the drawings so as to receive a packing 102 retained in position by means of a gland 103. This gland is retained against movement axially of the shaft 75 by means of bolts 104 and 105 which are fastened in a plate member 106 secured in turn as by means of welding to a collar 107 welded upon the inner end of the sleeve 87. The plate member 106 is secured as by means of bolts 108 to the rib 73 of the rotary valve 59.

The opposite end of the rotary valve is secured to a sleeve 109, mounted upon the shaft 75 for rotation relative thereto about the axis of the shaft, by means of a plate member 110 welded to the sleeve 109 and secured to the rib 74 of the rotary valve by means of bolts 111. A bushing 112 is interposed between the shaft 75 and the sleeve 109. The end of the shaft 75 adjacent to the sleeve 109 is journalled in a bearing 113 secured to the end framing member 31. A bushing 114 is interposed between the shaft and the bearing member 113.

A Z-shaped clip 115 is secured to the plate member 76 so that the upstanding flange 116 thereof is spaced from the plate member. The space thus provided is adapted to receive an arm 117 secured as by means of welding to the extension 88 mounted upon the outer end of the sleeve 87 in order to limit the closing movement of the rotary valve 59. The plate member 76, the upstanding flange 116 of the Z-shaped clip and the arm 117 are provided with openings which are alined when the rotary valve is in closed position and through which a locking pin (not shown) may extend in order to prevent movement of the valve.

The right-hand end of the shaft 75 and the sleeve 87 are readily accessible in order to rotate these members and open and close the rotary valve 59 and the door 60. For this purpose the indicated end of the shaft 75 is provided with opposed flat faces 118 and 119 so as to provide a deformed end which is adapted to be received within a similarly shaped opening 120 formed in one end of an actuating wrench 121. In order to impart rotation to the sleeve 87 relative to the shaft 75 the extension 88 secured to the sleeve is provided with opposed slots 122 and 123 which are adapted to receive projecting pins 124 and 125 secured to the opposite end of the wrench 121. By this construction it will be apparent that the shaft and the sleeve 87 may be operated from the same location by means of the same wrench.

In order to unload the container the door 60 is first opened. This is accomplished by sliding the first mentioned end of the wrench upon the shaft so that the deformed end thereof lies within the opening 120 in this end of the wrench. Rotation of the wrench in clockwise direction imparts rotation to the shaft but since adequate clearance is provided between the wrench and the extension 88 rotation is not imparted to the sleeve 87. Rotation of the shaft 75 brings about clockwise rotation of the arms 77 and through them downward movement of the curved link 79. Since the door 60 is hinged to the link the door is caused to swing downwardly about the hinge pins 67 and 68 until it reaches its open position.

At this time the wrench is removed from the shaft and the opposite end is slid over the end of the shaft so that the pins 124 and 125 enter the slots 122 and 123 in the extension member 88. The wrench is then rotated in clockwise direction so as to impart similar rotation to the sleeve 87. During the rotation of the sleeve 87 the shaft remains stationary since sufficient clearance between the latter end of the wrench and the shaft is provided.

Rotation of the sleeve 87 imparts rotation in the opening direction to the rotary valve 59 through the plates 106 and 110. This rotation is arrested by the engagement between the rotary valve and the curved link 78 which lies in the path of movement of the valve.

In closing the discharge opening the rotary valve is first returned to its closed position after which the door is closed. In the closing operation of the door the pivotal connection between the curved link 78 and the arms 77 passes beyond the vertical plane which includes the axis of rotation of the shaft. This insures tight engagement between the door 60 and the sealing strip 126 secured to the frame 19 around the door opening. Moreover, since the upward pull of the link 78 upon the door is substantially vertical and occurs substantially at the center of the door, and the hinge eyes 69 loosely engage the hinge pins 67 and 68, the pressure of the door against the sealing strip 126 is equalized, thereby insuring moisture-tight engagement between the door and the sealing strip.

This engagement is further insured by the described securement of the door to the link 78. By virtue thereof the door may be adjusted relative to the link by removing the pin 84 from the boss 83 and plates 85 and 86, turning the shank 82 in the boss 81 so as to move the boss 83 toward or away from boss 81 as required and then replacing pin 84.

It will be clear from the foregoing that the closure for the discharge opening of the container is moisture-tight and at the same time permits controlled discharge of the materials in the container.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

1. A container for bulk materials comprising a supporting base, a bottom discharge opening, a frame extending around and downwardly below said discharge opening, a shaft journalled in said frame, linkage secured to and operable by said shaft, a door hingedly mounted upon said frame below said discharge opening for closing said frame, said door swinging downwardly when being opened, means connecting said door to said linkage, a sleeve journalled in said container and mounted upon said shaft for rotation relative thereto about the axis of said shaft, and a rotary valve for closing said discharge opening, said valve being secured to and rotatable with said sleeve, said valve rotating downwardly when being opened, said shaft and said sleeve being operable independently of each other to open and close said door and said valve.

2. A container for bulk materials comprising a supporting base, a bottom discharge opening, a frame extending around and downwardly below said discharge opening, a shaft journalled in said frame, linkage secured to and operable by said shaft, a door loosely hingedly mounted upon said frame below said discharge opening for closing said frame, said door swinging downwardly when being opened, means disposed substantially at the center of said door connecting said door to said linkage, a sleeve journalled in said container and mounted upon said shaft for rotation relative thereto about the axis of said shaft, and a rotary valve for closing said discharge opening, said valve being secured to and rotatable with said sleeve, said valve rotating downwardly when being opened, said shaft and said sleeve being operable independently of each other to open and close said door and said valve, said means being adjustable relative to said linkage to insure tight engagement between said door and said frame.

3. A container for bulk materials comprising a supporting base, a bottom discharge opening, a frame extending around and downwardly below said discharge opening, a shaft journalled in said frame, linkage secured to and operable by said shaft, a door hingedly mounted upon said frame below said discharge opening for closing said frame, said door swinging downwardly when being opened, means for connecting said door to said linkage, a sleeve journalled in said container and mounted upon said shaft for rotation relative thereto about the axis of said shaft, and a rotary valve for closing said discharge opening, said valve being secured to and rotatable with said sleeve, said valve rotating downwardly when being opened, adjacent ends of said sleeve and shaft being spaced apart and having different configurations, said shaft and said sleeve being rotatable by a wrench, one end of said wrench being slidably engageable with said end of said shaft and said wrench being operable to impart rotation to said shaft independently of said sleeve, the opposite end of said wrench being engageable with said end of said sleeve and said wrench being operable to impart rotation to said sleeve independently of said shaft.

4. A container for bulk materials comprising a supporting base, a bottom discharge opening, a frame extending around and downwardly below said discharge opening, a shaft journalled in said frame, linkage secured to and operable by said shaft, a door hingedly mounted upon said frame below said discharge opening for closing said frame, said door swinging downwardly when being opened, means connecting said door to said linkage, a sleeve journalled in said container and mounted upon said shaft for rotation relative thereto about the axis of said shaft, a rotary valve for closing said discharge opening, said valve being secured to and rotatable with said sleeve, said valve rotating downwardly when being opened, said shaft and said sleeve being operable independently of each other to open and close said door and said valve, and cooperating members on said sleeve and container for limiting closing movement of said valve.

5. A container for bulk materials comprising a supporting base, a bottom discharge opening, a frame extending around and downwardly below said discharge opening, a shaft journalled in said frame, linkage secured to and operable by said shaft, a door hingedly mounted upon said frame below said discharge opening for closing said frame, said door swinging downwardly when being opened, means connecting said door to said linkage, a sleeve journalled in said container and mounted upon said shaft for rotation relative thereto about the axis of said shaft, and a rotary valve for closing said discharge opening, said valve being secured to and rotatable with said sleeve, said valve rotating downwardly when being opened, said shaft and said sleeve being operable independently of each other to open and close said door and said valve, said linkage lying in the path of opening movement of said valve when said door is open to limit opening movement of said valve.

6. A container for bulk materials comprising a supporting base, a bottom discharge opening, a frame extending around and downwardly below said discharge opening, a shaft journalled in said frame, a door loosely hingedly mounted upon said frame below said discharge opening for closing said frame, an arm secured to and rotatable with said shaft, a link pivotally secured to said arm, and means pivotally securing said link to said door substantially in the center thereof, said link being curved so as to extend partly around the underside of said shaft and dispose said means substantially beneath said shaft when said door is closed, said pivotal securement between said arm and link lying beyond the vertical plane including the axis of said shaft and center line of said means pivotally securing said link to said door when said door is closed.

References Cited in the file of this patent

UNITED STATES PATENTS

| | | |
|---|---|---|
| 1,222,603 | Clapper | Apr. 17, 1917 |
| 1,577,636 | Hayes | Mar. 23, 1926 |
| 1,937,232 | Kuehling | Nov. 28, 1933 |
| 2,345,468 | Doyle | Mar. 28, 1944 |